Aug. 19, 1941.    J. J. CRAWFORD    2,253,478
DIRECTION SIGNAL FOR MOTOR VEHICLES
Filed April 4, 1938    2 Sheets-Sheet 1
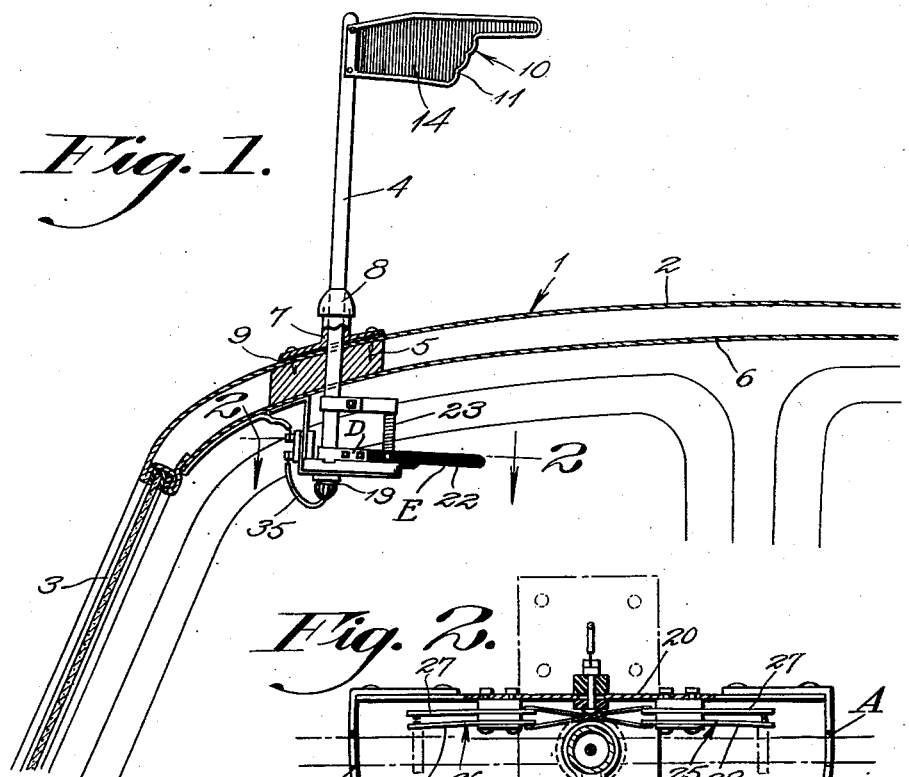
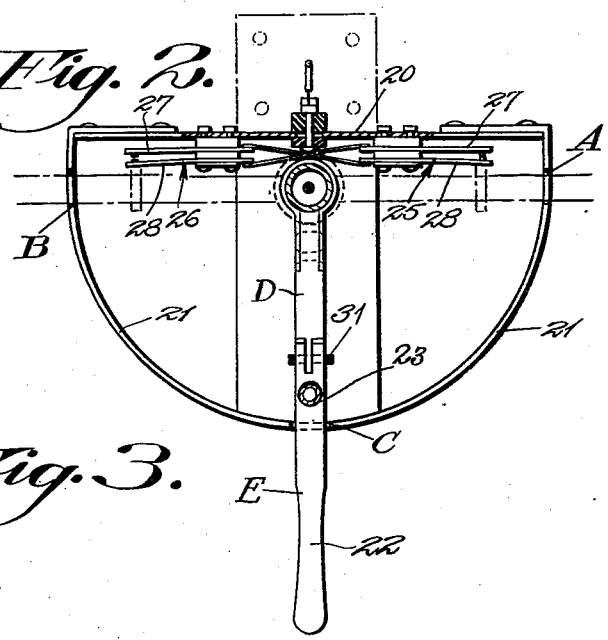
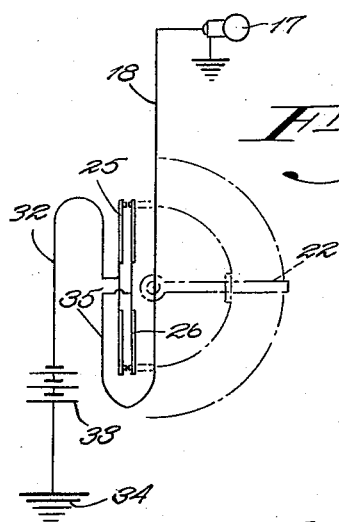
John J. Crawford
INVENTOR
BY Victor J. Evans & Co.
ATTORNEYS
R. E. Wise.
WITNESS Aug. 19, 1941. J. J. CRAWFORD 2,253,478
DIRECTION SIGNAL FOR MOTOR VEHICLES
Filed April 4, 1938  2 Sheets-Sheet 2
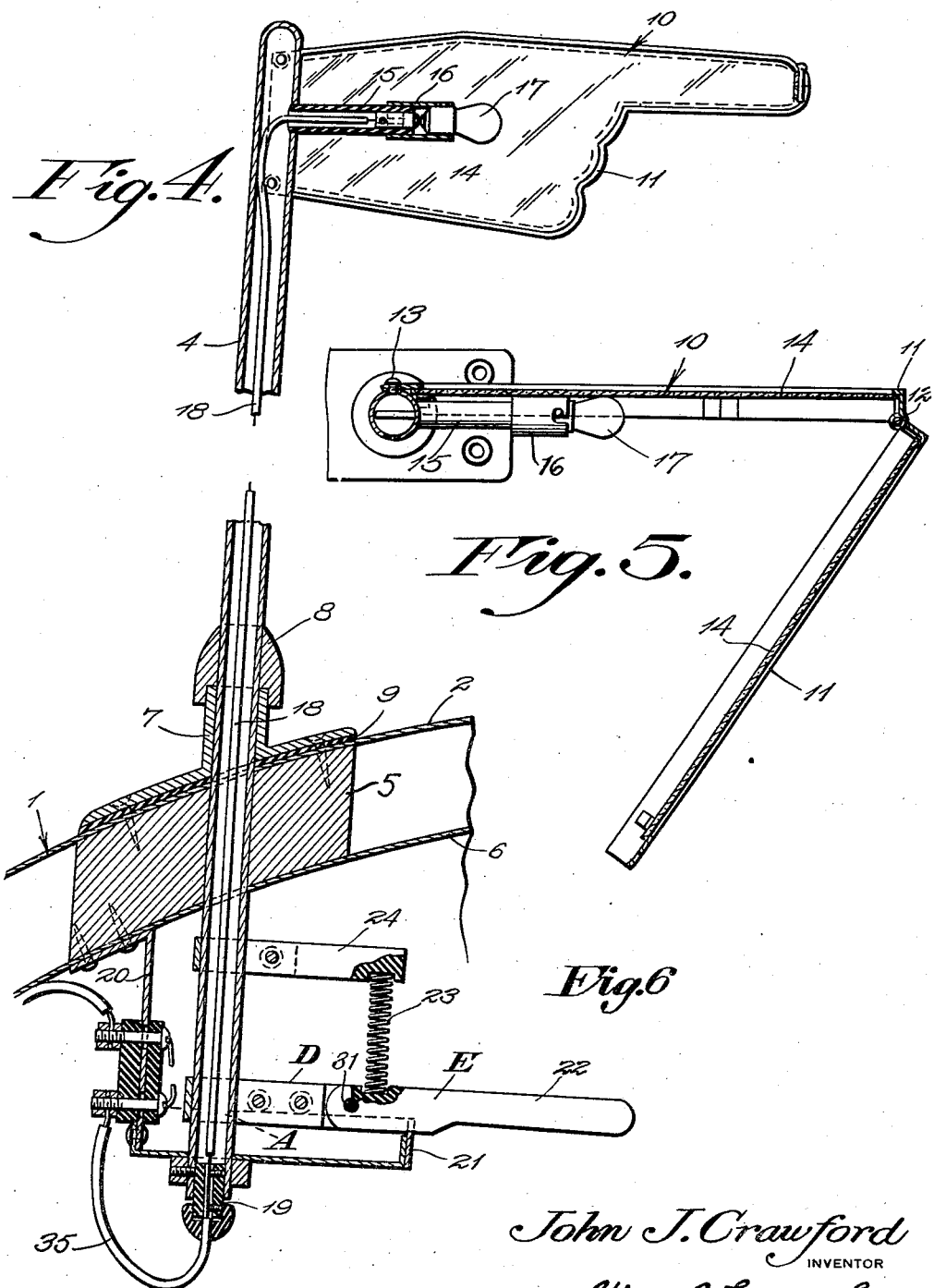
John J. Crawford
INVENTOR
BY Victor J. Evans & Co.
ATTORNEYS Patented Aug. 19, 1941

2,253,478

UNITED STATES PATENT OFFICE 2,253,478

DIRECTION SIGNAL FOR MOTOR VEHICLES

John J. Crawford, Astoria, Oreg.

Application April 4, 1938, Serial No. 200,023

1 Claim. (Cl. 116—48)

This invention relates to direction signals for motor vehicles and has for the primary object the provision of an efficient and inexpensive device of this character which will permit the driver of a vehicle to clearly indicate contemplated right and left hand turns, leaving the hands of the driver free to control the vehicle on the turn, and which will be in clear view of traffic and easily understood thereby either in the day time or at night or a maximum distance from said vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a portion of a motor vehicle showing a direction signal mounted thereon and constructed in accordance with my invention.

Figure 2 is a sectional view taken on line 2—2 of Figure 1.

Figure 3 is a diagrammatical view illustrating the wiring diagram of the signal.

Figure 4 is an enlarged vertical sectional view of the signal element and its support embodying a part of my invention.

Figure 5 is a horizontal sectional view showing the signal element opened to expose the electric lamp therein.

Figure 6 is an enlarged vertical sectional view of the portion of the device adapted to actuate the signal means, and illustrating the manner in which the same is applied to the roof of an automotive vehicle.

Referring in detail to the drawings, the numeral 1 indicates a fragmentary portion of a motor vehicle body, the roof of the body being indicated by the character 2 and the windshield by the character 3. In adapting the present invention to the automobile body 1, a hole is drilled through the roof 2 in close proximity to the windshield 3 so that a shaft 4 of the present invention may extend through the roof. Secured to the roof is a bearing block 5 covered or hidden from view by the usual lining 6 of the roof. The bearing block 5 acts to steady the shaft 4. A bearing sleeve 7 is secured on the roof with the shaft 4 extending therethrough and secured on said shaft 4 is a bearing cup 8 receiving the upper end of the bearing sleeve 7 cooperating with the latter in rotatably supporting the shaft and acting to exclude water. A suitable gasket 9 may be interposed between the bearing sleeve 7 and the roof 2 of the body 1. The shaft 4 extends a selected distance above the roof 2 and has mounted thereon a signal element 10, the general outline of which is in the form of a closed hand with the index finger extended. The signal element 10 consists of a sectional frame 11 wherein the sections are connected by a hinge 12 and screws 13. The frame is of skeleton formation having mounted therein colored panels 14 preferably of glass or some other material suitable for the purpose and preferably colored red. Supported by the shaft 4 within the signal element is a mounting 15 carrying an electric lamp socket 16 in which an electric lamp 17 is mounted. The mounting 15 is of hollow formation and the shaft 4 also is of hollow formation. Extending into the mounting 15 from the hollow shaft is an electrical conductor 18. The conductor 18 is connected with a fitting 19 mounted in the lower end of the shaft 4.

A bracket 20 is mounted on the inside of the motor vehicle body and forms a partial support for the shaft 4 and includes in its construction a quadrant 21 provided with notches A, B and C. A hand lever 22 is movable over the quadrant and includes sections D and E arranged in end to end relation and having the abutting ends formed with interfitting parts pivotally connected by an insulated pin 31. The section D is secured on the shaft 4. The section E of the handle 22 may be raised and lowered with respect to the quadrant so as to lift the section E into and out of the notches A, B and C. A coil spring 23 acts on the hand lever 22 causing the section E thereof to ride on the upper edge of the quadrant and to enter the notches when in alignment therewith. The coil spring is carried by an arm 24 fixed on the shaft 4.

The bracket 20 has electrical switches 25 and 26 mounted thereon and each including spring contacts 27 and 28 normally separable from each other. As illustrated in Figure 2, the ends of the pivot pin 31 extend from the handle and the contacts 28 are engaged by the extending ends of the pin, for operating the switches when the hand lever is positioned to engage with either of the notches A or B. The contacts 27 are electrically connected to each other and to an electric conductor 32 connected with an electric source 33 such as a storage battery. The electric source is connected to an electric ground 34, and the electric lamp through its mounting 15 and shaft 4 is grounded on the body of the motor vehicle. The contacts 28 are electrically connected to a conductor 35 which is connected to the fitting 19 establishing electrical connection with the conductor 18.

Normally the signal element points to the rear of the vehicle with the hand lever engaging with the notch C. When the signal element is in this position the circuit to the electric lamp is broken. However, when the hand lever is actuated to engage either the notch A or B the signal element is accordingly turned to indicate a right or left hand turn. When the hand lever is moved into engagement with either of the notches A or B the pin 31 engages one of the contacts 28 and completes the circuit through one of the switches to the electric lamp, thereby bringing about illumination of the signal element when pointing either to the right or left. The signal element will retain any of its positions due to the hand lever engaging in the notches of the quadrant, so that after the signal element has been actuated the driver is free to use the hands for the control of the vehicle.

What is claimed is:

A vehicle signal comprising the combination of, a vertical shaft rotatably mounted in the roof of the vehicle; signal means carried by and rotatable with the shaft exteriorly of the said vehicle; a supporting bracket mounted on the vehicle roof laterally of the shaft, said bracket including a vertical part extending in spaced parallel relation with the shaft and a horizontal part in the form of a segment having an upstanding peripheral flange, the said segment being located substantially above the operator's head and in a position to receive and support the lower end of the shaft; a handle member comprising cooperative sections; a horizontal insulated pivot pin connecting the sections of the handle and having the opposite ends thereof extending beyond the sides of the handle; one of the handle sections being fixedly attached to the shaft and extending laterally therefrom above the segment and the other of the said sections being adapted to swing in a vertical plane about the pivot pin and to overlie the peripheral flange of the segment in a manner to be removably received within spaced peripheral notches in the upper edge of the flange; a supporting arm fixedly secured to the shaft and rotatable therewith extending in spaced parallelism above the said handle member; spring means interposed between the said supporting arm and the movable section of the handle member to yieldably hold the said section seated in any one of the said notches; and a normally open switch mounted on the vertical part of the supporting bracket at each side of the segment and in the path traversed by the projecting ends of the said pivot pin, whereby the movable section of the handle may be moved upwardly against the resilient action of the said spring means to effect release of the same from the notch in which it is engaged and whereby swinging of the handle will effect rotation of the shaft and supporting arm to position the outer segment of the handle above a notch located adjacent one of the switches, the projecting end of the pivot pin contacting the switch to close the same and release of the handle permitting the said spring means to seat the outer section thereof within the mentioned notch and to securely hold the same therein.

JOHN J. CRAWFORD.